United States Patent Office 3,360,528
Patented Dec. 26, 1967

3,360,528
2-CHLORO-4H-1,3,2-DIOXAPHOSPHORIN-4-ONES AND PROCESS FOR PREPARING THEM
Joachim Ribka, Offenbach am Main, Germany, assignor to Farbwerke Hoechst Aktiengesellschaft vormals Meister Lucius & Bruning, Frankfurt am Main, Germany, a corporation of Germany
No Drawing. Filed July 13, 1965, Ser. No. 471,728
Claims priority, application Germany, July 16, 1964, F 43,452; Jan. 16, 1965, F 44,979; June 2, 1965, F 46,215; June 19, 1965, F 46,383
6 Claims. (Cl. 260—315)

ABSTRACT OF THE DISCLOSURE 2-chloro-4H-1,3,2-dioxaphosphorin-4-ones prepared by reacting an isocyclic or heterocyclic o-hydroxy carboxylic acid or alkali metal salt thereof with phosphorus trichloride and useful as flame-proofing agents for textiles.

---

The present invention provides new 2-chloro-4H-1,3,2-dioxaphosphorin-4-ones and a process for preparing them; it provides in particular compounds of the general formula

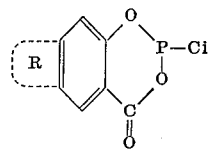

(1)

in which R represents an annulated isocyclic or heterocyclic ring system.

It has been found that the above-mentioned 2-chloro-4H-1,3,2-dioxaphosphorin-4-ones of Formula 1 can be prepared by reacting at an elevated temperature 1 mol of a compound of the general formula

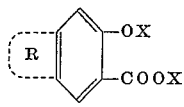

(2)

in which R has the meaning given above and X represents a hydrogen or alkali metal atom, with at least 1 mol of phosphorus trichloride.

When using compounds of Formula 2 in the form of free acids the process of the present invention can be carried out by mixing 1 mol of an isocyclic or heterocyclic o-hydroxycarboxylic acid with a molar excess of phosphorus trichloride and heating to temperatures above 50° C., advantageously to 75°–80° C., during this process compounds of Formula 1 are formed while 2 mols of hydrogen chloride are split off. These compounds can be isolated by distillation or filtration after removal of the excess of phosphorus trichloride.

The process of the present invention can advantageously be carried out in the presence of an inert organic solvent or diluent, for example benzene, toluene, chlorobenzene, benzine or dioxane. When operating in this manner the o-hydroxycarboxylic acid is heated together with the calculated quantity or an excess of phosphorus trichloride in one of the above-mentioned solvents or diluents to temperatures above 50° C., suitably to 75°–110° C. and the reaction product is isolated by distillation or filtration after the evolution of gas has ceased. When using as a compound of Formula 2 an alkali metal salt of an o-hydroxycarboxylic acid the reaction starts with a positive heat effect already below 50° C., for example at 25°–35° C., and is completed by heating to approximately 75°–110° C. It is also possible to effect the reaction even at higher temperatures or under elevated pressure. When using according to the present invention as starting product a dialkali metal salt of an o-hydroxycarboxylic acid, no hydrogen chloride evolution is effected during the reaction, whereas when using a monoalkali metal salt 1 mol of hydrogen chloride per mol of alkali metal salt is formed. In this method the reaction product in dependence of the solvent usually dissolves with simultaneous separation of the alkali metal chloride. The alkali metal chloride can be separated by filtration after the reaction has ceased. The reaction product is then obtained in its pure form from the filtrate for example by distillation. In the majority of cases it is not required for the further use to isolate the compounds of Formula 1 obtainable according to the process of the present invention. These compounds can rather be immediately used for further reactions after their formation—even in the abovementioned solvents or diluents and in most cases even without separation of the alkali metal chloride formed simultaneously. The process is suitable both for discontinuous and continuous methods or working.

As starting compounds of Formula 2 for the process of the present invention there are generally used aromatic or heterocyclic o-hydroxycarboxylic acids having at least 2 annulated rings, for example 2-hydroxynaphthalene-3-carboxylic acid and the substitution products thereof, such as halogeno-, alkyl- or alkoxy-2-hydroxynaphthalene-3-carboxylic acids, the o-hydroxy-carboxylic acids of tetrahydronaphthalene, anthracene, phenanthrene, chrysene, fluorene, carbazole, benzocarbazole, diphenyleneoxide, diphenylenesulfide, benzacridone, benzotriazole or quinoline. In the same manner there are used mono- or dialkali metal salts of the above-mentioned compound series in the process of the present invention. The alkali metal salts of o-hydroxycarboxylic acids can be prepared according to known methods, for example by reacting the o-hydroxycarboxylic acids with the calculated amount of an aqueous alkali metal hydroxide solution, during this process water is removed either by evaporation or by azeotropic distillation, for example with toluene. It is preferred to use for this purpose sodium or potassium hydroxide or mixtures thereof for their reasonable prices. In the same manner there may also be used other alkali metal hydroxides or mixtures thereof.

The 2-chloro-4H-1,3,2-dioxaphosphorin-4-ones of Formula 1 are compounds of very good reactivity which can be used in practice for various purposes. They can be used for example as flameproofing agents for textiles, and for the preparation of intermediary dyestuff products, dyestuffs and insecticides.

The following examples serve to illustrate the invention but they are not intended to limit it thereto, the parts being by weight unless otherwise stated and the relationship of parts by weight to parts by volume being that of the kilogram to the litre.

EXAMPLE 1

A mixture of 500 parts by volume of benzene, 94 parts of 2-hydroxynaphthalene-3-carboxylic acid and 80 parts of phosphorus trichloride is heated to the boil while stirring thoroughly. Soon a vigorous hydrogen chloride evolution sets in and during the reaction 2-hydroxynaphthalene-3-carboxylic acid dissolves. After an approximately 90 minutes boiling the evolution of hydrogen chloride ceases and the reaction is complete. At first benzene and the excess of phosphorus trichloride are distilled off and then the reaction product is distilled in vacuo. At temperatures from 158°–159° C. and at 5 mm. Hg 117 parts of 2 - chloro-4H-naphtho--[2,3-d]-1,3,2-dioxaphosphorin-4-one are obtained which solidify to form a colorless crystalline substance of a melting point of 126°–128° C.

EXAMPLE 2

A mixture of 700 parts by volume of benzene, 109 parts of 6-methoxy-2-hydroxynaphthalene-3-carboxylic acid and 80 parts of phosphorus trichloride are heated under reflux until the evolution of hydrogen chloride has ceased. Within approximately 1 hour the reaction is complete. After having removed the excess of phosphorus trichloride and benzene, 2 - chloro-7-methoxy-4H-naphtho-[2,3-d]-1,3,2-dioxaphosphorin-4-one is distilled in vacuo at temperatures of 198°–200° C. and at 3 mm. Hg. The yield is 202 parts. The compound obtained decomposes at 245° C.

In the analogous manner there can be obtained, while using 6-bromo-2-hydroxynaphthalene-3-carboxylic acid, 2 - chloro - 7-bromo-4H-naphtho-[2,3-d]-1,3,2-dioxaphosphorin-4-one.

EXAMPLE 3

A reaction mixture of 500 parts by volume of toluene, 94 parts of 2-hydroxynaphthalene-3-carboxylic acid and 70 parts of phosphorus trichloride is heated while stirring thoroughly. The hydrogen chloride evolution sets in at 80° C. which intensifies when elevating the temperature to 90° C. The temperature of the mixture is maintained at 90° C. for one hour. After this period hydrogen chloride develops no longer and the reaction is complete. The brownish yellow solution obtained contains the reaction product. It can be isolated according to Example 1. For most kinds of use, however, the above-mentioned solution may be directly subject to a subsequent treatment, since 2-chloro-4H-naphtho-[2,3-d]-1,3,2-dioxaphosphorin-4-one is present in the solution in sufficient purity.

EXAMPLE 4

A suspension prepared from 300 parts by volume of toluene and 94 parts of 2-hydroxynaphthalene-3-carboxylic acid is introduced into a reaction vessel by means of a dosing pump. Phosphorus trichloride is simultaneously dosed such that the quantities of phosphorus trichloride and 2-hydroxynaphthalene-3-carboxylic acid added correspond to a molecular proportion of 1.03 to 1.0 respectively. During this process the reaction temperature is maintained at 97° C. and the hydrogen chloride formed is removed by way of a condenser. The solution which contains the product of the process is poured off from the reaction vessel through an overflow after an average time of stay of 2 hours. The solution can be used directly for further reactions. It is also possible to distill toluene continuously and to use it again in the circular course. The distillation residue, too, contains the reaction product in a purity sufficient for further reactions.

EXAMPLE 5

A solution of 40 parts of sodium hydroxide in 40 parts by volume of water is added to a mixture of 1000 parts by volume of benzene and 188 parts of 2-hydroxynaphthalene-3-carboxylic acid while stirring thoroughly. The water is subsequently removed by azeotropic distillation. The whole is then cooled to 25° C. and while stirring 150 parts of phosphorus trichloride are added within a period of 60 minutes. The temperature of the reaction mixture rises to 40° C. and the mixture becomes more and more liquid. The whole is then slowly heated to the boil the hydrogen chloride evolution setting in at temperatures above approximately 45° C. After an approximate boiling of 90 minutes the reaction is complete. The sodium chloride formed during this process is filtered with suction and washed with benzene. From the filtrate first benzene and the excess of phosphorus trichloride are distilled and then the reaction product is distilled in vacuo which distills at 166° C. and at 4.5 mm. Hg. 228 parts of 2-chloro-4H-naphtho-[2,3-d]-1,3,2-dioxaphosphorin-4-one are obtained.

When in the above example 1200 parts by volume of ligroin or perchloroethylene are used as solvent instead of 1000 parts by volume of benzene the reaction develops in a similar manner. When using ligroin, 2-chloro-4H-naphtho - [2,3 - d]-1,3,2-dioxaphosphorin-4-one, however, dissolves only in part.

In analogous manner there can be obtained 2-chloro-7-bromo - 4H-naphtho-[2,3-d]-1,3,2-dioxaphosphorin-4-one when using 6-bromo-2-hydroxynaphthalene-3-carboxylic acid, and 2-chloro-7-methoxy-4H-naphtho-[2,3-d]-1,3,2-dioxaphosphorin-4-one when using 6-methoxy-2-hydroxynaphthalene-3-carboxylic acid.

EXAMPLE 6

The disodium salt of 2-hydroxynaphthalene-3-carboxylic acid is prepared from 1000 parts by volume of toluene, 188 parts of 2-hydroxynaphthalene-3-carboxylic acid and an aqueous solution of 80 parts of sodium hydroxide in the manner described in Example 5. The starting mixture is cooled to 35° C. and within a period of approximately 60 minutes 150 parts of phosphorus trichloride are added. The temperature of the reaction mixture rises to approximately 45° C. When subsequently heating slowly a further reaction sets in at temperatures above 50°–55° C., the temperature rises up to about 70° C. Stirring is then continued for one hour at 90°–95° C. and the excess of phosphorus trichloride is subsequently distilled off. The remaining reaction mixture can be directly used for further reactions or worked up by filtration and distillation according to Example 5. The yield is 235 parts of 2 - chloro - 4H-naphtho-[2,3-d]-1,3,2-dioxaphosphorin-4-one.

When in the above example a part of sodium hydroxide is replaced by the equivalent quantity of potassium hydroxide the reaction develops in a similar manner.

EXAMPLE 7

According to Example 5 a suspension of the potassium salt of 2-hydroxynaphthalene-3-carboxylic acid in xylene is prepared from 1200 parts by volume of xylene, 188 parts of 2-hydroxynaphthalene-3-carboxylic acid and an aqueous solution of 56 parts of potassium hydroxide by means of azeotropic separation of water. Within approximately 15 minutes 150 parts of phosphorus trichloride are added at temperatures within 30°–35° C. and the reaction mixture is subsequently heated. At a temperature of about 75° C. the evolution of hydrogen chloride sets in. The whole is heated for about 90 minutes to 95°–105° C. and the excess of phosphorus trichloride is distilled off. The remaining reaction mixture can be directly used for further reactions. It is also possible to work it up according to Example 5 by separating the potassium chloride by filtration and subsequently distilling off. The same result is obtained when using instead of xylene chlorobenzene.

EXAMPLE 8

A suspension of 105 parts of the sodium salt of 2-hydroxynaphthalene-3-carboxylic acid in 300 parts by volume of toluene is prepared and introduced into a reaction vessel by way of a dosing pump. Phosphorus trichloride is simultaneously dosed in such a manner that the quantity added of phosphorus trichloride and the sodium salt of 2-hydroxynaphthalene-3-carboxylic acid correspond to the molecular proportion of 1.03:1.0 respectively. During this process the reaction temperature is maintained at 100° C. and hydrogen chloride formed is removed by way of a condenser. The solution containing the product of the process as well as sodium chloride leaves the reaction vessel after an average time of stay of 40 minutes and may be directly used for further reactions.

EXAMPLE 9

A mixture of 400 parts by volume of toluene, 126 parts of 2-hydroxyanthracene-3-carboxylic acid (content of purity 94%) and 46 parts by volume of phosphorus trichloride is heated to 100° C. and treated at this temperature until the evolution of hydrogen chloride has ceased. The solution is sucked off hot from the undissolved substance, the filtrate is cooled with ice water, the precipitate is filtered with suction and recrystallised from petroleum ether. 119 parts of 2-chloro-4H-anthraceno-[2,3-d]-1,3,2-dioxaphosphorin-4-one are obtained which correspond to the formula

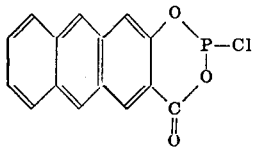

and which have a melting point of 176°–178° C. (decomposition).

EXAMPLE 10

A mixture of 800 parts by volume of toluene, 91 parts of 5,6,7,8-tetrahydro-2-hydroxynaphthalene-3-carboxylic acid and 50 parts by volume of phosphorus trichloride is heated to the boil within 2 hours and then the boiling temperature is maintained for another hour. Then first toluene is distilled off and subsequently the reaction product in vacuo. At a temperature of 140°–141° C. and at 0.2 mm. Hg 55 parts of 2-chloro-4H-6,7,8,9-tetrahydronaphtho-[2,3-d] - 1,3,2 - dioxaphosphorin-4-one of the formula

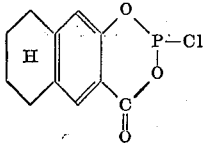

are obtained in form of a colorless viscous oil having a refractive index of $n_D^{26}=1.594$.

EXAMPLE 11

A mixture of 1000 parts by volume of chlorobenzene, 80 parts of 2-hydroxycarbazole-3-carboxylic acid and 32 parts by volume of phosphorus trichloride is heated to 125° C. within 3 hours. When the hydrogen chloride evolution has ceased the whole is filtered hot and the filtrate is cooled. The precipitate which has separated is then filtered with suction, washed with dry petroleum ether and recrystallised from chlorobenzene. 85 parts of 2-chloro - 4H-carbazolo-[2,3-d]-1,3,2 - dioxaphosphorin-4-one of the formula

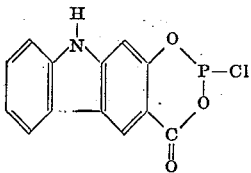

are obtained in form of pale yellow crystals of a melting point of 195° C. (decomposition).

EXAMPLE 12

A mixture of 1000 parts by volume of chlorobenzene, 68.2 parts of 5'-hydroxy-1,1',2,2'-benzocarbazole-4'-carboxylic acid and 25 parts by volume of phosphorus trichloride is slowly heated to 130° C. After about 2 hours the hydroxycarboxylic acid has completely dissolved. After filtering hot the filtrate is cooled and the yellow precipitate which has separated is filtered with suction. After recrystallisation from chlorobenzene 2-chloro-4H-indolo-[3',2'-7,8]-naphtho-[2,3-d] - 1,3,2 - dioxaphosphorin-4-one of the formula

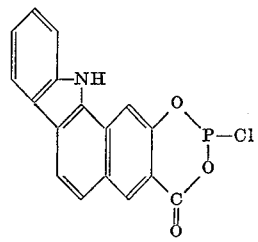

and of a melting point of 257°–259° C. (decomposition) is obtained.

EXAMPLE 13

A mixture of 800 parts by volume of toluene, 110 parts of 3-hydroxydiphenyleneoxide-2-carboxylic acid and 45 parts by volume of phosphorus trichloride is heated to 105° C. within 3 hours and kept boiling for 2 hours. After filtering hot the filtrate is contracted in vacuo to 200 parts by volume and the solution is mixed with 200 parts by volume of petroleum ether. The precipitate which has separated is filtered with suction and recrystallised from toluene. 115 parts by volume of 2-chloro-4H-dibenzofurano-[3,2-d]-1,3,2-dioxaphosphorin - 4 - one of the formula

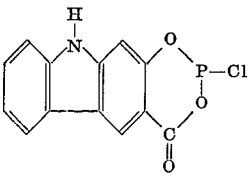

are obtained in form of yellow crystals of a melting point of 172°–175° C. (decomposition).

EXAMPLE 14

A suspension of the sodium salt of 2-hydroxycarbazole-3-carboxylic acid is prepared from a mixture of 80 parts of 2-hydroxycarbazole-3-carboxylic acid, a solution of 14.2 parts of sodium hydroxide in a small quantity of water and 1000 parts by volume of chlorobenzene by azeotropic distillation of the water. After dehydration the suspension is cooled to 80° C., 32 parts by volume of phosphorus trichloride are added and the whole is heated. Hydrogen chloride separates during this process at approximately 100° C., the separation ceases at 125° C. The sodium chloride is subsequently separated from the chlorobenzene solution by decantation and washed with 500 parts by volume of hot chlorobenzene. The chlorobenzene solutions are combined and cooled and 91 parts of 2-chloro-4H-carbazole - [2,3d]-1,3,2-dioxaphosphorin-4-one of the formula are separated. By recrystallisation from chlorobenzene there are obtained pale yellow lamellae of a melting point of 197°–200° C. (decomposition).

EXAMPLE 15

45 parts of 5'-hydroxy-1,1',2,2'-benzocarbazole-4'-carboxylic acid and the solution of 5.6 parts of sodium hydroxide in a small quantity of water are suspended in 1000 parts by volume of chlorobenzene. The mixture is heated to the boil and the water is removed by azeotropic distillation. After cooling to 60° C. 19 parts by volume of phosphorus trichloride are added. Then the whole is heated to 120°–125° C. until the hydrogen chloride evolution is complete. The solution is now separated by hot filtration from the sodium chloride formed, cooled and the precipitate is filtered with suction. After recrystallisation from chlorobenzene 24 parts of 2-chloro-4H-indolo-[3′,2′-7,8]-naphtho-[2,3-d]-1,3,2-dioxaphosphorin-4-one of the formula

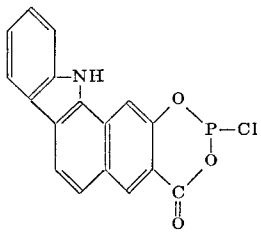

and of a melting point of 250°–253° C. (decomposition) are obtained. By concentrating the mother liquor and adding petroleum ether another 8 parts of the reaction product are obtained.

EXAMPLE 16

A suspension of the sodium salt of 3-hydroxydiphenyleneoxide-2-carboxylic acid is prepared from a mixture of 110 parts of 3-hydroxydiphenyleneoxide-2-carboxylic acid, 800 parts by volume of toluene and a solution of 20 parts of sodium hydroxide in a small quantity of water by means of azeotropic distillation of the water. The suspension is then cooled to 40° C., 46 parts by volume of phosphorus trichloride are added and the whole is heated to the boil. During this process the hydrogen chloride evolution sets in at approximately 80° C. and ceases after about 30 minutes. The solution is now filtered hot from the sodium chloride separated, cooled and the precipitate is filtered with suction. By recrystallisation from toluene 64 parts of 2-chloro-4H-dibenzofurano-[3,2-d] - 1,3,2 - dioxaphosphorin-4-one of the formula

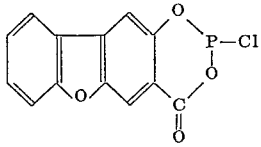

and of a melting point of 178°–180° C. (decomposition) are obtained. By concentrating the mother liquor and adding petroleum ether another 9 parts of the reaction product are obtained.

I claim:
1. A 2-chloro-4H-1,3,2-dioxaphosphorin-4-one having the formula

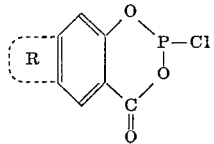

wherein R taken together with the annulated benzene nucleus represents a radical selected from the group consisting of naphthalene, 5,6,7,8-tetrahydronaphthalene, 6-methoxy-naphthalene, 6-bromo-naphthalene, anthracene, carbazole-(2,3), indolo - (3′,2′-7,8) - naphthalene-(2,3), and diphenyleneoxide-(3,2).

2. The compound of the formula

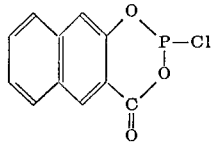

3. The compound of the formula

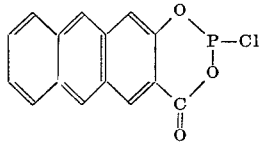

4. The compound of the formula

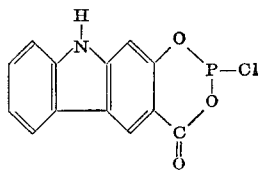

5. The compound of the formula

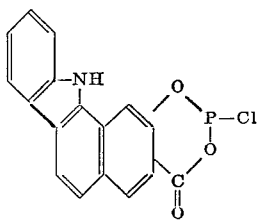

6. The compound of the formula

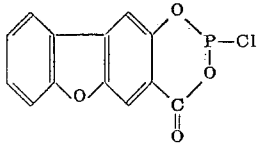

References Cited

Young, Chem. Abstracts 48: 149 (1954).
Cade et al., Chem. Abstracts 49: 4657 (1955).

JOHN D. RANDOLPH, *Primary Examiner.*
WALTER A. MODANCE, *Examiner.*
C. M. SHURKO, *Assistant Examiner.*